July 28, 1931. H. D. GA NUNG ET AL 1,816,478
CARBURETED WATER GAS APPARATUS
Filed July 24, 1926 4 Sheets-Sheet 1
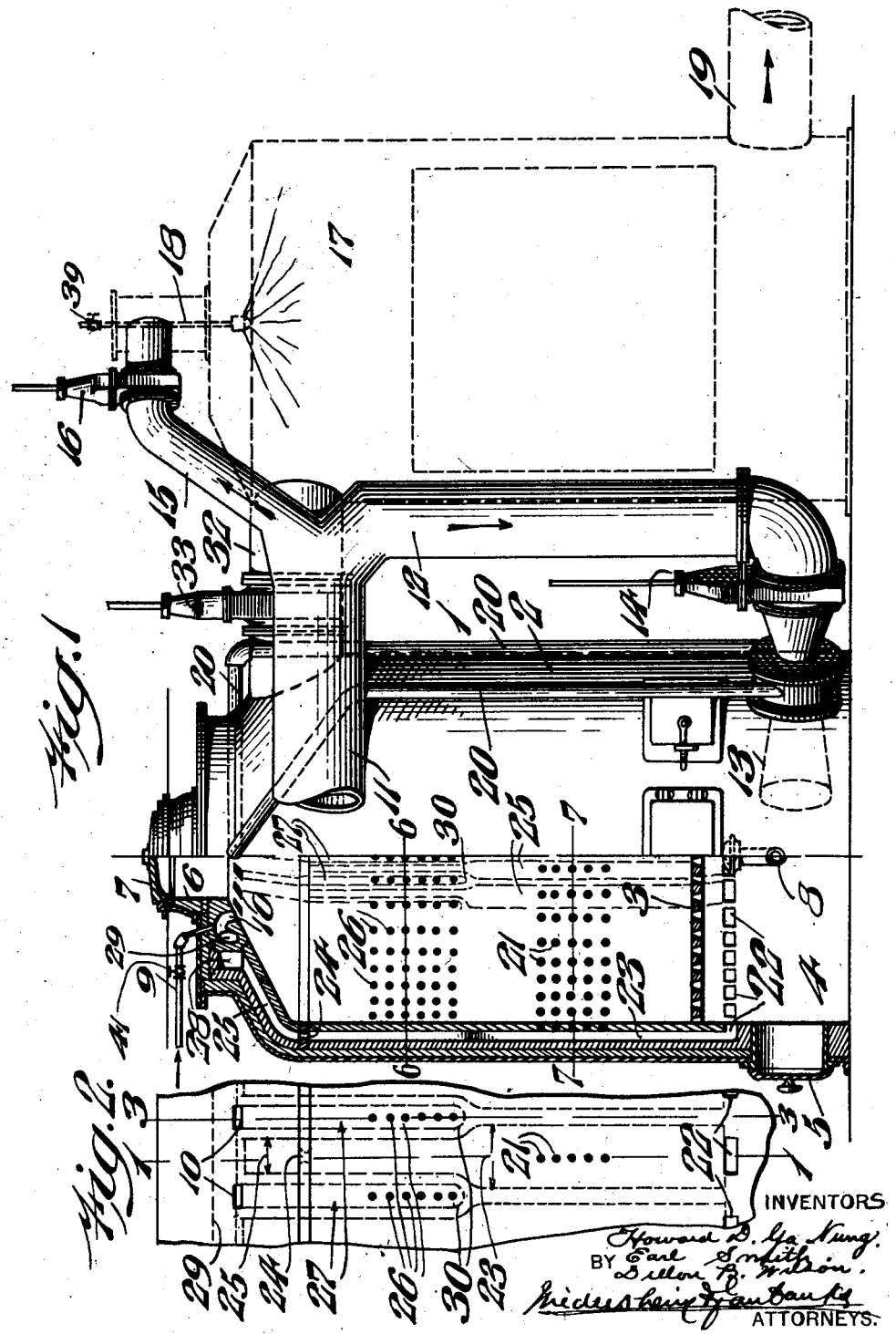
INVENTORS
Howard D. Ga Nung.
Earl Smith.
BY Dillon B. Wilson.
ATTORNEYS.

July 28, 1931.  H. D. GA NUNG ET AL  1,816,478
CARBURETED WATER GAS APPARATUS
Filed July 24, 1926  4 Sheets-Sheet 2
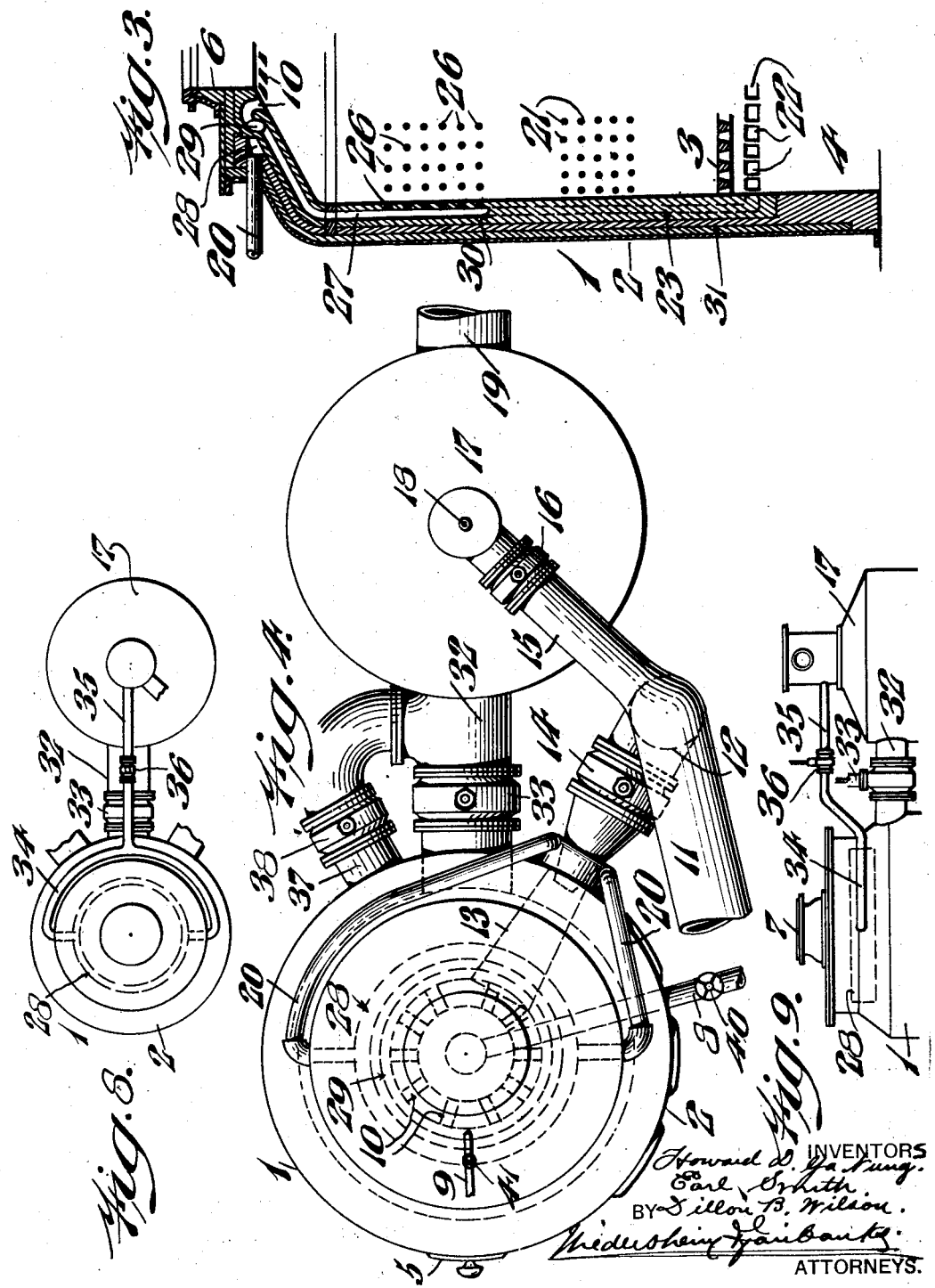

July 28, 1931. H. D. GA NUNG ET AL 1,816,478
CARBURETED WATER GAS APPARATUS
Filed July 24, 1926  4 Sheets-Sheet 3

INVENTORS
Howard D. Ga Nung
Earl Smith
BY Dillon B. Wilson
ATTORNEYS.

July 28, 1931. H. D. GA NUNG ET AL 1,816,478
CARBURETED WATER GAS APPARATUS
Filed July 24, 1926 4 Sheets-Sheet 4
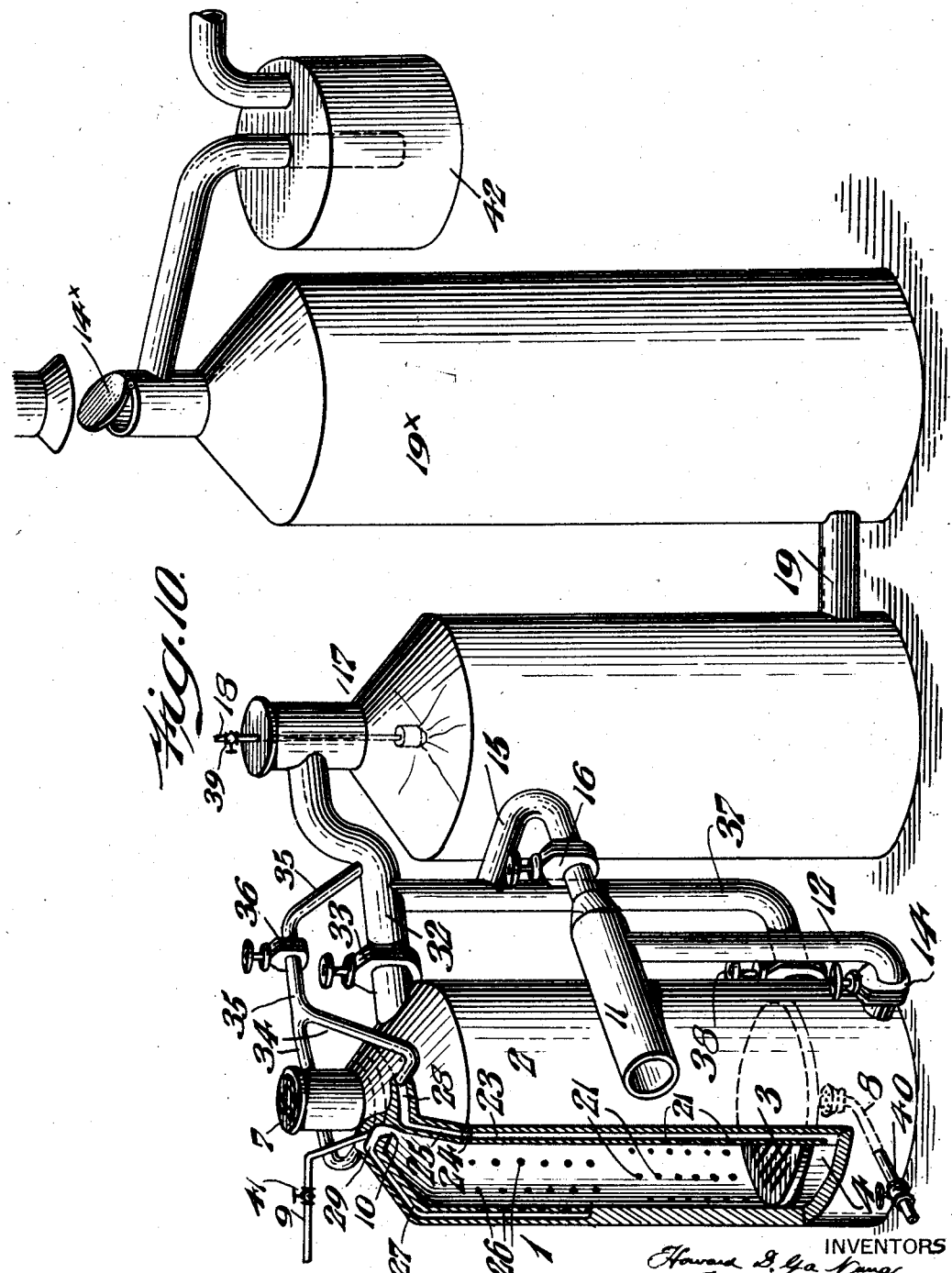

Patented July 28, 1931

1,816,478

UNITED STATES PATENT OFFICE

HOWARD D. GA NUNG, OF LLANERCH, PENNSYLVANIA, EARL SMITH, OF ATLANTIC CITY, NEW JERSEY, AND DILLON B. WILSON, OF PHILADELPHIA, PENNSYLVANIA

CARBURETED WATER GAS APPARATUS

Application filed July 24, 1926. Serial No. 124,581.

In a blue water gas generator or carbureted water gas set, it is well known that clinker forms at the bottom of the generator just above the grate up through the center of the fuel bed and in a ring around the walls of the generator at the hottest zone in the fuel, which is about midway of the depth of the fuel bed. The introduction of air increases combustion and causes clinker, while the introduction of steam or carbon dioxide into the clinker zone tends to disintegrate the clinker or retard its formation.

The object of our invention is to distribute the air or oxygen throughout the fuel bed, so as to get the latter hot in the quickest time, to distribute the steam through the hot fuel bed in a manner to get the greatest make of gas per run either up or down and by our novel means and method hereafter described to reduce the liability of clinker formation as much as possible, to cool the lining blocks by the novel method hereafter described, so as to prevent clinker from clinging to the walls and to increase the life of the lining, and lastly to utilize the heated air or oxygen, to increase the temperature of combustion in the generator or to more nearly complete combustion of carbon monoxide given off during the generator blasting period, thus storing up more heat in the carbureter checker work.

To the above ends, our invention relates generally to a novel construction of a water gas generator and more particularly to the lining thereof, and its adjuncts, wherein the refractory material constituting the lining is formed and laid in such a manner to produce a novel construction of flues or channels having ports leading into the fuel bed at different heights in combination with a means of circulating a cooling medium through said flues and novel means for controlling the distribution and velocity of said cooling medium, together with means for the conserving of heat absorbed by the cooling medium in its passage through said flues and the use of said preheated cooling medium to accelerate combustion in the generator itself or to complete combustion in the carbureter.

It further consists in a novel construction of vertically arranged flues which communicate at their bottom with the ash pit, and at their upper ends terminate in an annular channel near the top of the generator, said flues being arranged so as to discharge the preheated medium into the lower portions of the combustion chamber, while an intermediate set of flues discharge the preheated medium or steam at points near the upper portion of the fuel bed.

It further consists of a novel construction of a generator having flues of the character last described, in combination with means for introducing steam into the upper portion of the generator, and means for introducing steam and compressed preheated air into the ash pit of said generator. By our novel construction and method we are enabled to introduce either air or steam through the side walls of the generator into the fuel bed on the down run, whereby we obtain a maximum make of gas per run either up or down and reduce the liability of clinker formation to a minimum, by the introduction of steam or carbon dioxide, as hereafter explained.

By our novel construction, we are further enabled to cool the lining blocks, so as to prevent clinkers from clinging to the generator walls thereby increasing the life of the lining, the circulation medium being confined to definite channels, whereby uniform distribution may be positively regulated and the action of cooling may be controlled as desired.

By our novel process and apparatus, we are further enabled to make use of the heated air or oxygen to increase the temperature of combustion in the generator or to more nearly complete combustion of carbon monoxide given off during the generator air blasting period, thus storing up more heat in the carbureter checker work.

For the purpose of illustrating our invention, we have shown in the accompanying drawings, forms thereof which are at present preferred by us, since they will give in practice, satisfactory and reliable results, although it is to be understood that the various instrumentalities of which our invention consists can be variously arranged and organized and that our invention is not limited to the precise arrangement and organization of these instrumentalities as herein shown and described.

Referring to the drawings,

Figure 1 represents a side elevation partly in section, of a gas generator embodying our invention, showing also a portion of the steam and air pipes connected therewith, the section being taken on line 1—1 of Fig. 2.

Figure 2 represents a diagrammatic side elevation of Fig. 1 flattened to show the general relation of the upper and lower flues, whereby the preheated medium is discharged into the fuel bed at different levels.

Figure 3 represents a sectional view of a portion of the left hand of the generator, the section being taken on the line 3—3 of Fig. 2.

Figure 4 represents a top plan view of Fig. 1.

Figure 7:
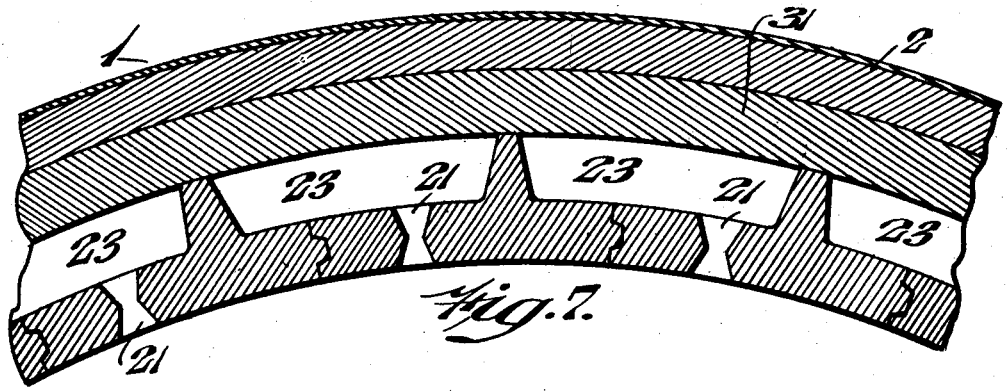
Figure 6:
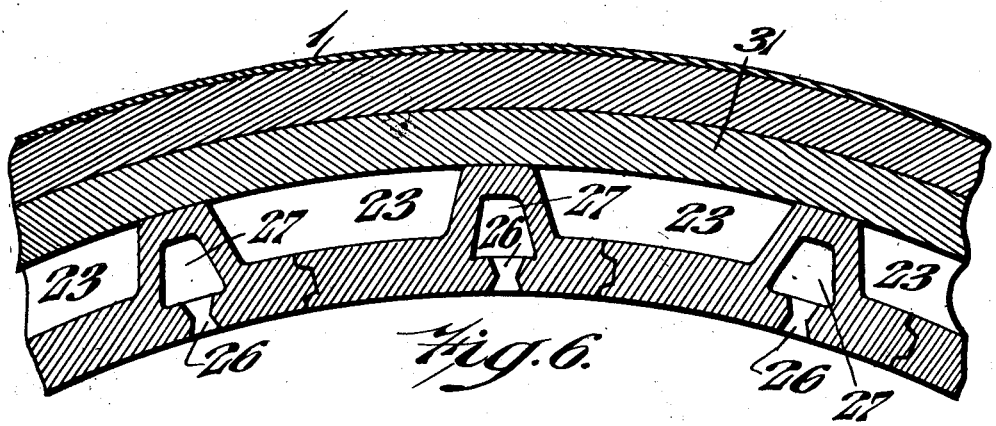
Figure 5:
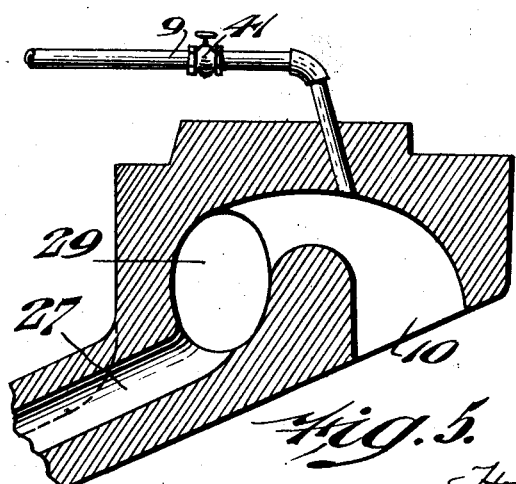
Figure 5 represents, on an enlarged scale, a vertical sectional view of the upper portion of certain of the flues seen in Figs. 1 and 3.

Figures 6 and 7 represent on an enlarged scale, horizontal sectional views showing the manner of forming the vertical flues in the generator wall, Fig. 6 being taken on line 6—6 of Fig. 1 and Fig. 7 on line 7—7 of Fig. 1. Fig. 8 represents a top plan view of the left hand portion of Fig. 10. Fig. 9 represents a fragmentary view in side elevation of the left hand portion of Fig. 10. Fig. 10 represents a perspective view of a modified form of carburetted water gas apparatus.

Referring to the drawings, in which like reference numerals indicate like parts, 1 designates my novel construction of a water gas generator, which except in the particulars hereinafter mentioned, may be of a conventional form. The generator has the outer shell 2, the grate 3 and the ash pit 4, ash pit door 5, the top charging opening 6 and the closure 7 therefor. 8 designates the steam pipe located in the ash pit 4 and discharging upwardly towards the grate 3. 9 designates the steam pipe discharging steam through the ports 10 into the upper portion of the generator. 11 designates the air blast pipe into which air under pressure is conducted from any suitable source, said pipe having the downwardly extending branch 12 which discharges into the ash pit 4, as indicated at 13, the discharge of air into the ash pit being controlled by the valve 14. The upper branch 15 leads from the compressed air main 11, and is provided with a valve 16 and discharges into the carburetor 17, which may be of the usual construction, and provided with the oil supply pipe 18. 19 designates a pipe leading from the carburetor to the superheater 19$^x$, both said carburetor and superheater being of the usual construction. 20 designates pipes, which lead from the upper annular channel or flue 28 at the top of the generator at opposite points thereof to the lower portion of the compressed air pipe 12, which discharges into the ash pit 4. The upper ends of the pipes 20, communicate directly with the annular flue 28, as will be understood from Figs. 3 and 4.

21 designates a series of ports, which communicate with the fuel bed at points a little below the mid-height of the generator, as will be understood from Figs. 1 and 3, the preheated medium being conducted to said ports 21, through the ports 22 in the ash pit 4, below the grate 3, which lead to the vertical flues or channels 23, which extend vertically up to the point 24, where a restricted passage is formed in each flue as will be understood from Figs. 1 and 2. The flues 23 extend upwardly above said restricted ports 24 as indicated at 25, and terminate in the annular flue 28 in the top of the generator. 26 designates a series of ports which discharge the preheated medium into the upper portion of the fuel bed, said medium being conducted downwardly through the flues 27, which lead from the annular flue 29, which communicates with the upper ports 10, downwardly to about the points 30 just below the upper ports 26, as will be understood from Figs. 2 and 3.

As will be understood from Figs. 2 and 6, the downwardly extending flues 27, which lead from the annular upper inner flue 29, are positioned between pairs of flues 23, and while said flues 23 and 27 are preferably formed by the employment of blocks correlated with the inner lining 31 substantially as seen in Figs. 6 and 7, it will be evident that other equivalent block or flue constructions may be employed if desired.

The upper outer flue 28 and the upper inner flue 29 are horizontally disposed and concentrically arranged with respect to each other, as will be understood from Figs. 1 and 4.

32 designates a pipe leading from the top of the generator 1 to the top of the carbureter 17 and provided with a valve 33. In the construction seen in Figs. 1 and 2 I have shown the pipes 20 leading from the annular upper outer flue 28 to the lower portion of the air blast pipe branch 12, while in Figs. 8, 9 and 10, 34 designates pipes which lead from the flue 28 to the single pipe 35, having the valve 36 therein, which leads to the top of the carbureter.

The operation is as follows:—

Our invention is particularly applicable to a carburetted water gas set, where there is a connection from the generator to the carbureter, and from the latter to a superheater, which latter we have not shown, in Fig. 1, but in Fig. 10, as its function and mode of operation will be evident to those skilled in this art.

The water gas generator having been charged with coal or coke, the latter is blasted with air under forced draft until this mass becomes quite hot. The products of combustion pass off at the top of the generator through the pipe 32, the valve 33 being open, into the carbureter and down through the checkerbrick work thereof, thence out at the bottom through the pipe 19 and up through the superheater 19$^x$ to the atmosphere. After this operation has continued for a brief period, the auxiliary blast valve 16 is opened allowing air to enter the top of the carbureter and combine with the air blast gases passing over from the generator. The lower blast valve 14, which has heretofore been open, is closed, the damper 14$^x$ of the superheater is closed shutting off the connection to the atmosphere. The generated gas is then led to a wash box 42 for purification, whence it is conducted to suitable storage apparatus, not shown.

Steam is now introduced through the pipe 8, under the grate 3 of the generator, and passes up through the hot zone of fuel, where it is decomposed and forms water gas which is largely carbon monoxide and hydrogen, which passes from the generator through the pipe 32, through the hot checkerbrick work of the carbureter, where it is heated still hotter and picks up enrichment from the oil sprayed over the checkerwork, from the pipe 18. Steam is now shut off from pipe 8, valve 33 is closed, valve 38 is opened, and steam is admitted through pipe 9, filling the upper space of the generator above the fuel, part passing downwardly through the fuel bed, where it is decomposed and forms water gas which passes out through the ash pit and pipe 37, through valve 38 to the top of the carbureter. Part of the steam in the upper chamber is forced back through ports 10, and annular distributing flue 29, down through the flues 27, and out through openings 26 into the exterior of the fuel bed.

Sometimes a short down blow of steam is introduced at this point.

The steam pipe 8 is used on the up run and the steam pipe 9 on the down run. Assuming that a cycle has been completed, the valve 14 is opened and also the valve 33, and the valve 16 is closed. The compressed air passes through the pipe 12 into the ash pit 4, and by the injector action, sucks heated air through the pipes 20 from the annular flue 28, air simultaneously being forced through the ports 22, flues 23, restricted ports 24 and upper flues 25 into the annular flue 28. There is, consequently, a continuous circulation of air through the above named conduits, which obviously effectively cools the generator lining during its passage therethrough. A portion of the air in its passage through the flues 23 is forced through the ports 21 into the fuel bed, but if desired, the ports 21 may be omitted. During this operation, a large portion of the air is forced from the ash pit 4, up through the grate 3, and the bed of fuel thereon. The introduction of the heated air into the fuel bed as above described, increases the temperature thereof, and consequently, the gas production. The foregoing operation may be continued for a short period of time, and at the termination of the blow as above described, the valve 16 is opened, and admits compressed air directly into the top of the carbureter, as is evident.

The valves 14, 36 and 16 are next closed, and steam is admitted to the pipe 8, and into the ash pit 4, a large portion of the steam ascending through the fuel bed, and a portion ascending into the flues 23 and 25, to the annular flue 28. A portion of the steam passes upwardly through the injector 13 and pipes 20 into the annular flue 28, following which, a certain amount of steam is discharged through the ports 21 into the fuel bed, to facilitate an increased gas production.

Steam is next closed off from the pipe 8 and valve 33 is closed. Steam is now admitted through the pipe 9. The valve 38 in the pipe 37, leading from the generator ash pit 4 to the top of carburetor 17, is now opened. A portion of the steam from the pipe 9, passes out the ports 10 downwardly through the fuel bed, while another portion of said steam flows from the annular flue 29, downwardly through the flues 27, and through the ports 26 into the upper or hottest portion of the fuel bed.

The introducing of steam through the ports 26 into the sides of the hottest portion of the fuel bed, not only increases the gas production, but in addition, prevents and retards clinker formation.

The gas produced by the decomposition of steam on the down run passes from the ash pit 4 through the pipe 37 to the top of the carbureter 17.

The operations above described are repeated until the fuel bed is burned down, so that it needs replenishing. It will be apparent from the foregoing that the temperature within the generator is greatly increased, so that the fuel bed is hotter than heretofore, thus greatly increasing the gas make, when the steam is introduced through either pipe 8 or 9 in the up or down run. Especial attention is directed to the elimination and reduction of clinker formation, which is effected by the introduction of steam through the ports 21 and 26 into the hot zone of the fuel bed. If desired, carbon dioxide can be introduced through the ports 21 and 26 for the purpose of reducing or preventing clinker. Oxygen may be introduced through the blast main 11 in place of air.

In Figs. 8, 9 and 10, we have shown the branch pipes 34, communicating with the annular upper flue 28 and leading therefrom through the valve 36 and pipe 35 to the top of the carbureter 17. The pressure in the ash pit 4 of the generator is much greater than the pressure in the top of the carbureter, and consequently, when the valve 36 is open, there will be a constant flow of heated air into the top of the carbureter. The valves 36 and 14 or 36 and 16 may, in practice, be connected together so as to be opened and closed simultaneously, or independently. When the pipes 34 and 35 are employed, the pipes 20 and the injector 13 are omitted. The introduction of the hot air through the pipe 35 into the top of the carbureter 17, combines with the carbon monoxide in the blast gas given off from the generator at the beginning of the cycle, and causes immediate and complete combustion in the top of the carbureter, thus conserving a large portion of the carbon monoxide, which would otherwise pass out to the air unburned, thereby increasing the heat stored up in the checker work, which results in a better fixing of the enrichment oil.

It will be understood that while we have shown flues 23 and 27 as being arranged vertically, said flues may be inclined or spirally disposed with respect to the generator lining, without departing from the spirit of our invention. Also it is to be understood that while we have shown the ports 21 and 26 as terminating below and above the mid-height of the generator, the number of said ports can be increased or diminished and said ports can be differently positioned with respect to the mid-height of the generator without departing from the spirit of our invention.

It will be further apparent that while we have shown in Figs. 6 and 7, a preferred form of the lining block whereby the flues 23 and 27 are formed, said flues can be constructed from differently shaped blocks if desired.

It will be evident that while we have shown the upper annular flues 28 and 29 concentrically arranged in the upper portion of the generator within the latter, said flues may be arranged exteriorly to the generator if desired, for example such as a bustle pipe.

In practice it will be understood that the oil pipe 18 is provided with a suitable valve 39, as seen in Figs. 1 and 10, and the lower steam pipe 8 is provided with a valve 40, as seen in Figs. 4 and 10, and the upper steam pipe 9 is provided with a valve 41. In the perspective view seen in Figure 10 we have shown the superheater $19^x$ and the wash box 42 in conjunction with the carbureter 17, as these elements are generally assembled in practice and the construction seen in Fig. 10 conforms generally to the construction seen in Figs. 8 and 9 already referred to wherein the pipes 34 and 35 and the valve 36 are employed. In the Figure 10 we have shown the pipe 35 as leading directly into the pipe 32 which leads to the top of the carbureter but it will be evident that the mode of operation will be the same as shown in Figs. 8 and 9, where the pipe 35 is shown as connected directly to the carbureter. In the following schedule, we have indicated the functions and positions of the various valves during the various stages in the operation of our novel device.

When the set is shut down the valves 14, 38, 16, 40, 41, 36 and 39 are closed and the valve 33 and damper $14^x$ is open.

For the air blast, open the valve 14 starting the blast, and follow by opening the valves 16 and 36, the air passing through the flues, or passages 23.

For the up make, close the valves 14, 16, 36 and the damper $14^x$ at the top of the superheater and open valves 39 and 40 thereby admitting steam to the passages 23, and oil to the carbureter.

For the down run, open valves 38 and 41 and close the valve 33 and the valve 40 in the steam pipe 8, thereby admitting steam downwardly through the flues 27.

For the steam purge, open the valve 33 and the valve 40 in the pipe 8, close the valve 38 and the valve 41 in the steam pipe 9 and the valve 39 in the oil pipe 18, admitting steam through the passages 23.

For the blast, open damper $14^x$ and valves 14, 16, and 36 and close the valve 40 in the steam pipe 8, thereby admitting air through passages 23.

It will now be apparent that we have devised a novel and useful carbureted water gas apparatus, which embodies the features of advantage enumerated as desirable in the statement of the invention and the above description and while we have in the present instance, shown and described preferred embodiments thereof which will give in practice, satisfactory and reliable results, it is to be understood that such embodiments are susceptible of modification in various particulars without departing from the spirit or scope of the invention or sacrificing any of its advantages.

Having thus described our invention, what we claim as new and desire to secure by Letters Patent is:—

1. A carburetted water gas apparatus comprising in combination, a water gas generating chamber, an ash pit, a series of flues extending upwardly from said ash pit to the top of said generating chamber, and discharging through ports near the mid-height thereof, an annular outer horizontal flue in which said upwardly extending flues terminate, an inner annular, horizontal flue, a steam pipe leading to the latter flue, said inner annular flue having ports leading to the top of said generating chamber, flues extending downwardly from said inner annular flue to a point near the mid-height of said generating chamber, a carbureter, a valved connection from the top of said generating chamber to the top of said carbureter, a valved connection from the lower portion of said generating chamber to the top of said carbureter, a steam pipe in the ash pit of said generating chamber, and an air blast pipe having a valved branch discharging into said ash pit and another valved branch discharging into the top of the carbureter.

2. A carburetted water gas apparatus comprising in combination, a water gas generating chamber, an ash pit, a series of flues extending upwardly from said ash pit to the top of said generating chamber, and discharging through ports near the mid-height thereof, an annular outer horizontal flue in which said upwardly extending flues terminate, an inner annular horizontal flue, a steam pipe leading to the latter flue, said inner annular flue having ports leading to the top of said generating chamber, flues extending downwardly from said inner annular flue to a point near the mid-height of said generating chamber, a carbureter, a valved connection from the top of said generating chamber to the top of said carbureter, a valved connection from the lower portion of said generating chamber to the top of said carbureter, a steam pipe in the ash pit of said generating chamber, an air blast pipe having a valved branch discharging into said ash pit and another valved branch discharging into the top of the carbureter, and connections from said upper, outer, horizontal flue, leading to the lower portion of said blast pipe.

HOWARD D. GA NUNG.
EARL SMITH.
DILLON B. WILSON.